United States Patent
Knolle

[11] Patent Number: 6,122,578
[45] Date of Patent: Sep. 19, 2000

[54] ACTIVE CONTROLS FOR VEHICULAR SUSPENSIONS

[76] Inventor: Ernst G. Knolle, 2691 Sean Ct., SSF, Calif. 94080

[21] Appl. No.: 09/335,967

[22] Filed: Jun. 18, 1999

[51] Int. Cl.[7] .................................. G06F 7/76; G06F 7/70
[52] U.S. Cl. .................. 701/37; 701/47; 701/40; 701/48; 180/164; 280/5.5; 280/5.503; 246/370
[58] Field of Search .................. 701/37, 48, 40, 701/47; 280/5.5, 5.503, 5.504, 5.515; 180/164, 116, 313; 246/370

[56] References Cited

U.S. PATENT DOCUMENTS

| | | |
|---|---|---|
| 5,189,615 | 2/1993 | Rubel et al. . |
| 5,347,457 | 9/1994 | Tanaka et al. . |
| 5,450,322 | 9/1995 | Tanaka et al. . |
| 5,483,450 | 1/1996 | Titli et al. . |
| 5,559,700 | 9/1996 | Majeed et al. . |
| 5,701,245 | 12/1997 | Ogawa et al. . |
| 5,701,246 | 12/1997 | Uchiyama . |
| 5,911,768 | 6/1999 | Sasaki ........................................ 701/38 |
| 5,931,879 | 8/1999 | Neumann et al. ......................... 701/37 |
| 5,935,181 | 8/1999 | Iwasaki ..................................... 701/37 |
| 5,987,369 | 11/1999 | Kwak et al. .............................. 701/37 |

*Primary Examiner*—William A. Cuchlinski, Jr.
*Assistant Examiner*—Olga Hernandez

[57] ABSTRACT

The relative motion and force between two interconnected elements can be counteracted with active controls when such motion and force is predictable. Magnitudes, wavelengths and locations of rocking motion by vehicles traveling along fixed guideways can be recorded, and such records can be used in subsequent trips to predict rocking motion causing forces. Active controls can be installed and programmed to exert timely counteracting forces to prevent rocking motion forces from passing from wheels via springs to upper vehicle bodies.

5 Claims, 4 Drawing Sheets

ACTIVE CONTROLS FOR VEHICULAR SUSPENSIONS

BACKGROUND OF THE INVENTION

The present invention relates to a method for preventing the transmission of motion and force fluctuations from a first element to an interconnected second element. More specifically it relates to fixed guideway emanating vehicular rocking motion and force fluctuations of unsprung lower vehicle element from being transmitted via suspension spring to sprung upper vehicle element.

Primary vehicle suspension isolates a sprung upper element from the object on which it is mounted, the unsprung lower element. There are three general mount types: passive, semi-active and active. Passive mounts (engineered rubber mounds, springs with friction dampers, or, most commonly, springs with viscous dampers) are limited in performance. The semi-active systems use sensors and control hardware and software to determine what response actions are possible to achieve marginal control and isolation of the sprung element without using a power source for providing the control force. Active controls use sensors, software, control hardware with a power source to achieve full control and isolation of sprung element.

SUMMARY OF THE INVENTION

The present invention provides for a fixed guideway vehicle active controls for preventing the transfer of rocking motion force fluctuations from an unsprung lower to a sprung upper element movably interconnected through a linkage which includes a spring assembly which tends to maintain the elements at an equilibrium position; said active controls comprising:

(a) means for locating, measuring and recording rocking motion of vehicle along guideway;
(b) means for predicting rocking motion of vehicle based on prior experience and forward pointing instruments;
(c) generators of reciprocating forces to counteract rocking motion;
(d) power supply for generators of reciprocating forces;
(e) controls for timing and sizing of reciprocating forces to counteract rocking motion.

The present invention is specifically directed at preventing rocking motion in high-speed trains, which run on exclusive tracks, use similar vehicles in each train and generally travel at the same high speed. This physical sameness causes vehicles to also have near identical rocking motion resonance frequencies with adverse effects. For example, a prevailing breeze at a tunnel exit causes all emerging vehicles to lurch sideways at the same location and rebound at resonance frequency. Not being fully resilient, tracks then yield under localized strain and become increasingly wavy, and vehicles thereafter rock even more. In presently existing high-speed train systems, track maintenance is a major expense and requires nightly system shutdowns.

There are other than rocking motion disturbances, which can also be addressed by the present invention, for instance, unexpected lateral thrusts. When motion sensing equipment detects tilting without evidence of track irregularities, controls may call for resistance thereto, such as against tilting in curves.

BRIEF DESCRIPTION OT THE FIGURES

DETAILED DESCRIPTION OF THE INVENTION

Figure 1:
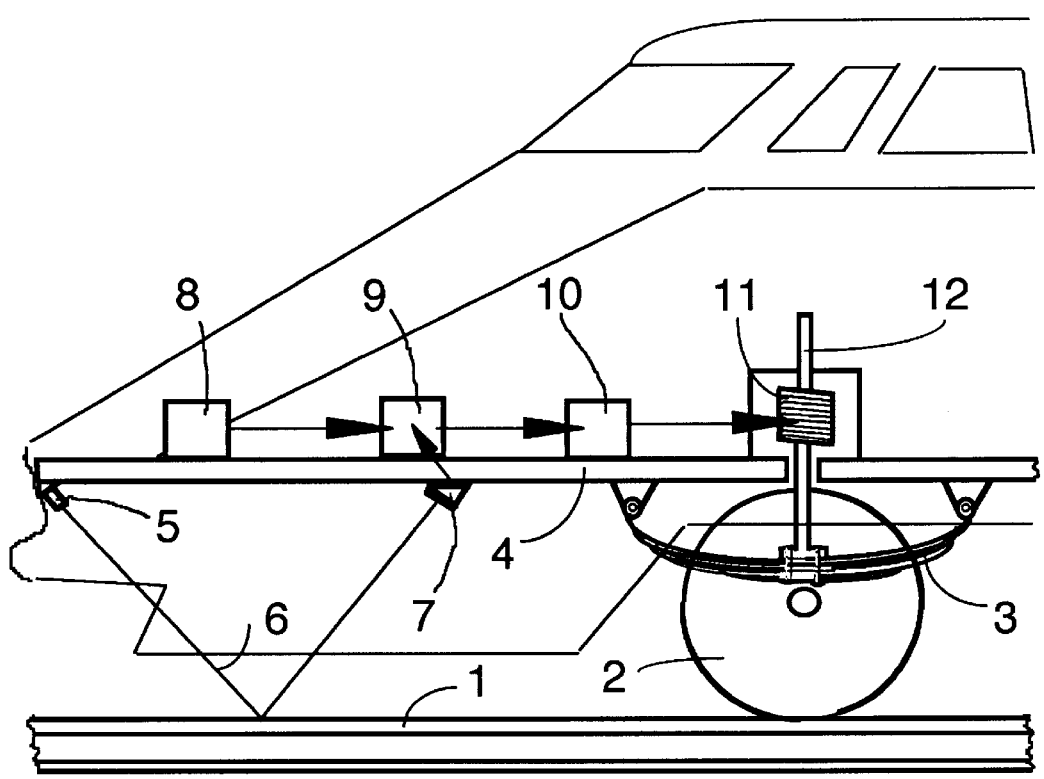
FIG. 1 shows an outline of the lead vehicle of a high-speed train with active controls.

FIG. 1 shows a general arrangement of active controls at the front of a typical high-speed vehicle on dual rails. Direction of travel is from right to left. Viewed side wheel 2 rolls on viewed side rail 1. Spring 3 connects wheel 2 to chassis 4. Mounted on chassis at forward location is light source 5 directing an oblique light beam 6 at the surface of rail 1 of which rail unevenness reader 7 reads the reflection. On input from reader 7 and motion sensor 8, computer 9 instructs power source 10 to energize solenoid 11 to either pull up or push down on connecting rod 12, which is attached to bearing of wheel 2 and in sliding engagement with solenoid 11 attached to chassis 4. Information of rail unevenness ahead of vehicle may also be obtained by other detection means such as by forward pointing video camera or laser gun. Previously recorded data of rail unevenness either by vehicle during a previous pass over the same track, by another train or by a special track testing vehicle may also be used. For concurrently observed rail unevenness ahead of wheel 2 of vehicle it is important that the information is processed fast enough from reader 7 to computer 9 to power source 10 and to solenoid 11 so that reciprocating forces in connection rods 12 are occurring at the exact time when corresponding rail unevenness passes under wheel 2. For wheels behind first wheel 2 computer 9 issues, commensurate with vehicle speed, delayed instruction for each power source 10 and solenoid 11 of each subsequent wheel on rail 1. Wheels on opposite rail have similar but separate controls. Generally, when a pull instruction is given on one side of vehicle, a push instruction is given simultaneously on the opposite side.

Figure 2:
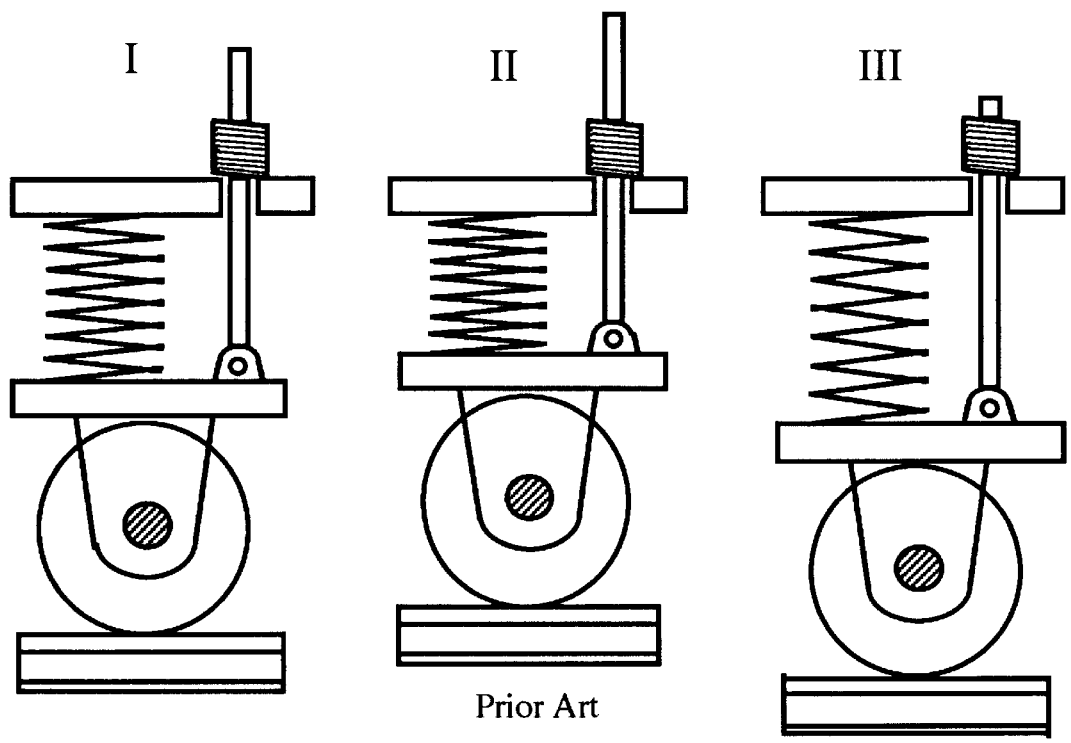
FIG. 2 shows an illustration of solenoid powered active controls in three typical modes.

FIG. 2 shows an active controls illustration with spring 3 as a coil spring in three stages of compression. Shown are positions I under normal load, position II when wheel 2 rolls over a hump and position III when wheel 2 rolls through a depression in rail 1. Positions II and III are shown exaggerated. Normally, track irregularities of high-speed train systems, for which the present invention is most suitable, amount to only fractions of a millimeter in amplitude with wavelengths of about 100 meters. In position I solenoid is not energized, in position II solenoid is inducing a pulling force in rod 12 and in position III solenoid is inducing a pushing force in rod 12.

Figure 3:
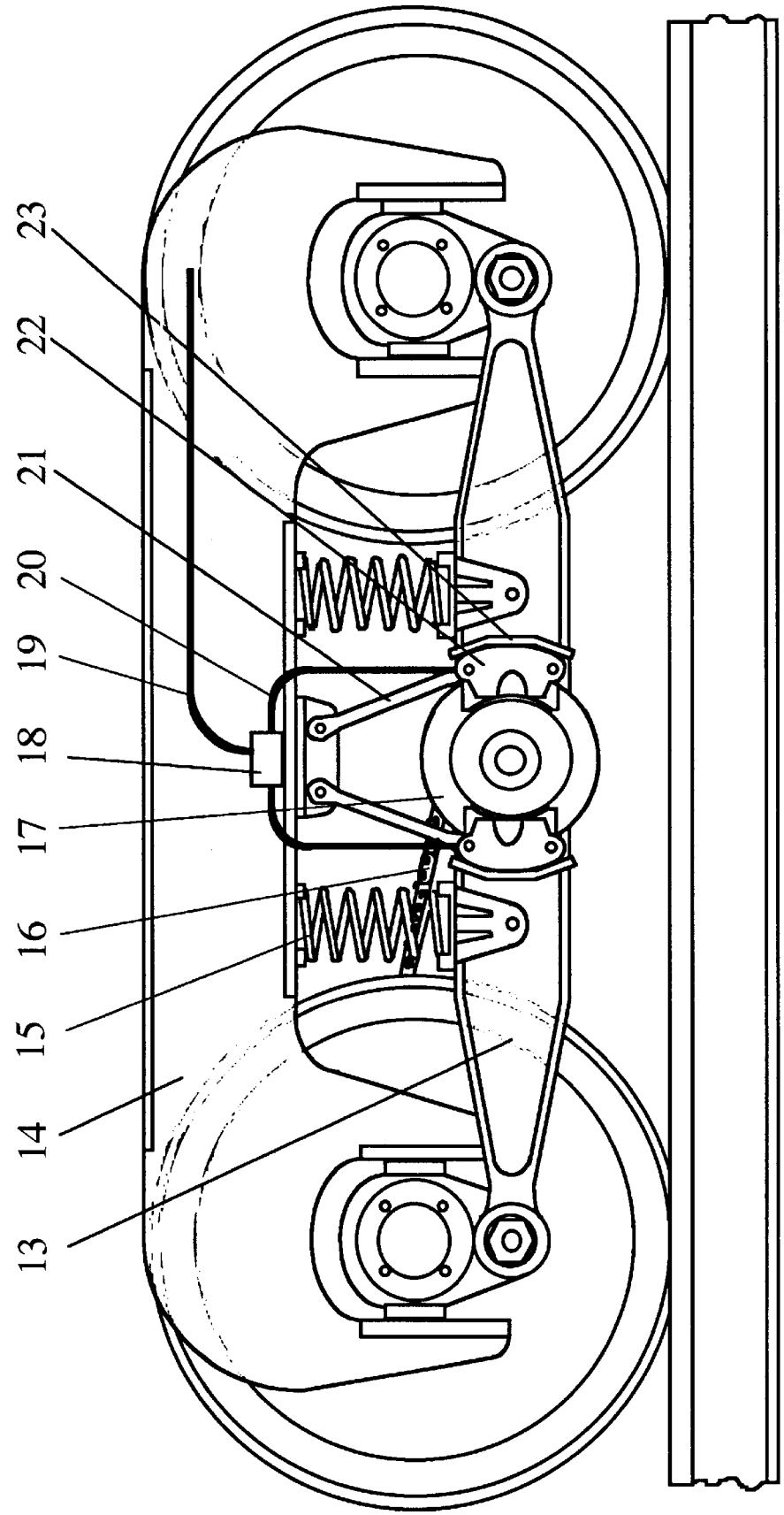
FIG. 3 shows a side view of a two-axle bogie of a vehicle with mechanical active controls.

FIG. 3 shows a side view of a typical two-axle bogie of a vehicle with active controls. Shown are two axles held together by unsprung element 13 and the sprung element 14 suspended above by springs 15. The active control unit is here shown as mechanical, rather than as electromagnetic. It consists of a shaft installed parallel to axles midway in unsprung element 13, driven by chain 16 from an axle and having attached at each end friction disk 17. Attached to sprung element 14 is electronic control valve 18 which receives pressurized caliper control fluid through fluid line 19 and which, on command from computer 9, opens valve ports transmitting via flexible fluid lines 20 pressurized fluid alternately to two, by vertical rods 21 from sprung element 14 suspended, horizontally opposed calipers 22. Guides 23 allow calipers to rotate up and down through an arc with constant distance from the center of disk 17. When bogies are removed for maintenance calipers 22 slide out at the top above disk 17 without the need to disconnect fluid lines 20.

Figure 4:
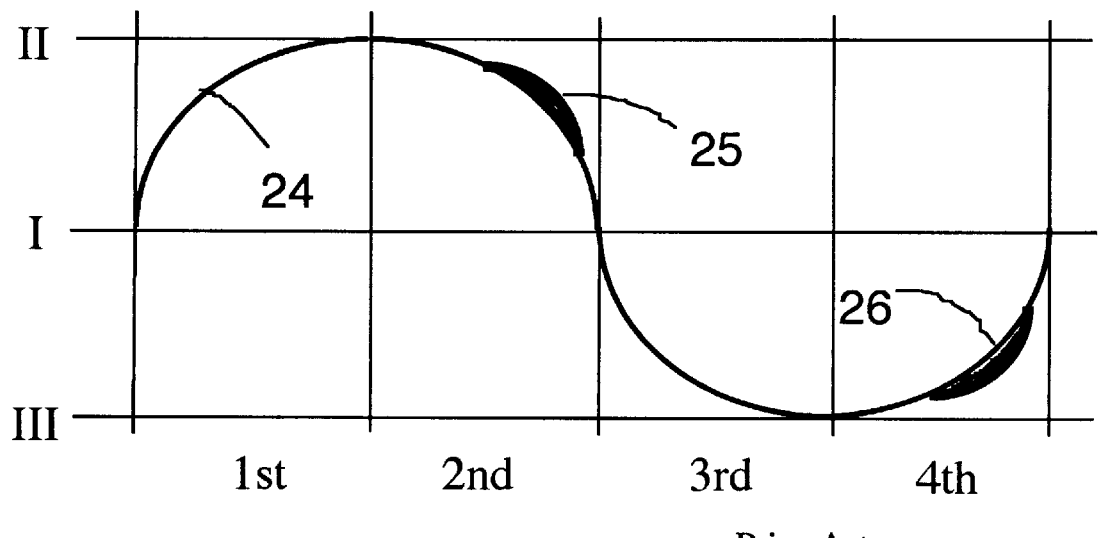
FIG. 4 shows a graph of a rocking motion waveform with locations where reciprocating active control forces are applied.

FIG. 4 shows a graphic presentation of one cycle of a rocking vehicle's spring compression fluctuation curve 24. Beginning at the left from normal compression position 1, going to high compression position II, then to low compression position III and returning to normal compression position I. The curve is divided into four quadrants. In the second quadrant, wheel flanges on one side of vehicle make contact with their rail and receive impulse 25. In the fourth quadrant, wheel flanges on the opposite side of vehicle make contact with the other rail and receive impulse 26. The energy equivalent of impulses 25 and 26 is reduced to zero in each cycle by friction, and is replaced by new impulses in the next cycle, and so on, which then causes vehicle to rock continuously at an approximate frequency of one Hertz (one cycle per second). Active controls solenoid 11 and calipers 22 are energized timely and sufficiently in the second quadrant and fourth quadrant to oppose and nullify impulses 25 and 26, allowing sprung element 14 to remain undisturbed.

Figure 5:
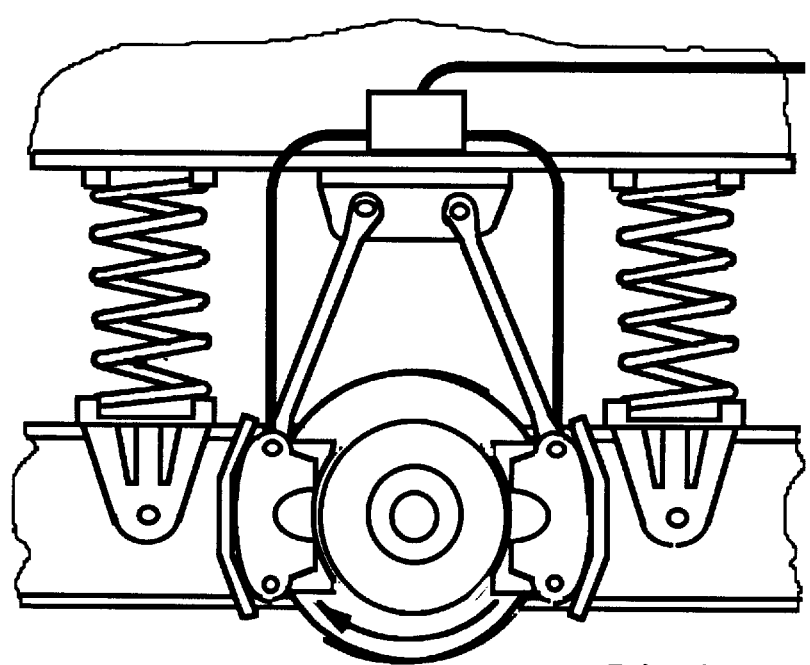
FIG. 5 shows a cutout from FIG. 3 with mechanical active controls not applied when springs are in equilibrium at average state of compression.

FIG. 5 is a cutout from FIG. 3 showing unsprung element 13 and sprung element 14 in equilibrium with springs 15 in average compressed condition. Calipers 22 are not energized. Not shown is an unpressurized bleed line, which returns control fluid from relaxed calipers 22 to a reservoir.

Figure 6:
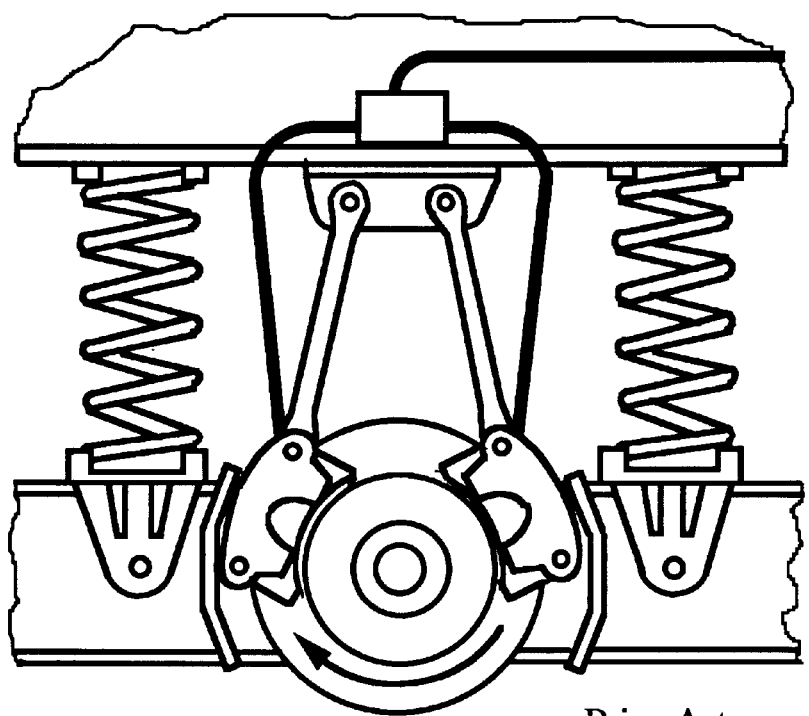
FIG. 6 shows a cutout as in FIG. 5 with mechanical active controls energized to produce a vertical pushing force while wheels on viewed side of bogie pass through a depression in the track and springs are expanded below average state of compression.

FIG. 6 is a cutout as in FIG. 5 showing approximate caliper 22 positions when wheels 2 on viewed side of bogie pass through a depression in rail 1, causing unsprung element 13 to be lowered relative to sprung element 14, which in turn causes springs 15 to become extended and their lifting force reduced. In order to prevent sprung element 14 from being lowered due to reduced supporting spring force, electronic valve 18 allows pressurized caliper control fluid to energize caliper 22 on upward rotating side of friction disk 17 creating a pushing force in its rod 21 between sprung and unsprung elements in magnitude designed to equal lifting force reduction by springs 15.

Figure 7:
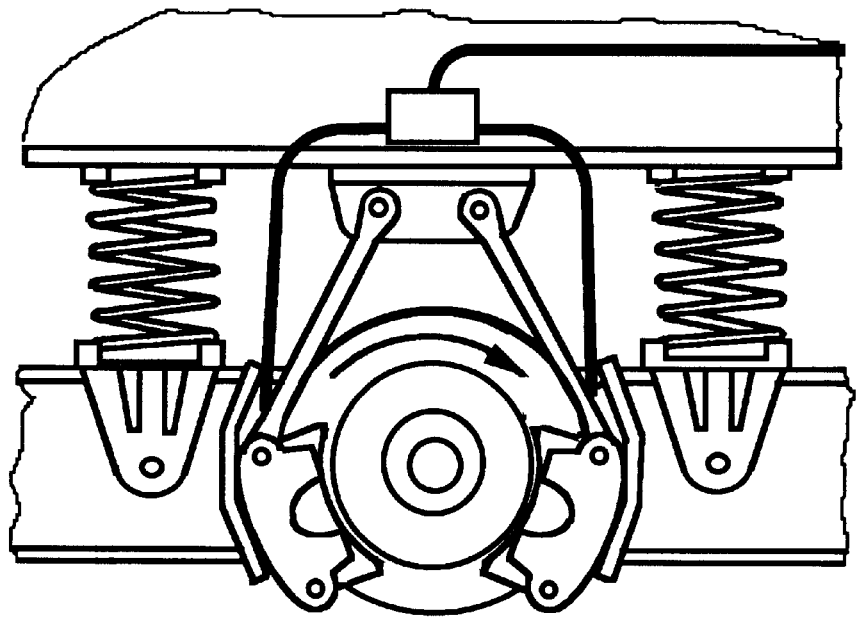
FIG. 7 shows a cutout as in FIG. 5 with mechanical active controls energized to produce a vertical pulling force while wheels on viewed side of bogie pass over a hump in the track and springs are compressed above average state of compression.

FIG. 7 is a cutout as in FIG. 5 showing approximate caliper 22 positions when wheels 2 on viewed side of bogie pass over a hump in the rail 1, causing unsprung element 13 to be raised relative to sprung element 14, which in turn causes springs 15 to become compressed and their lifting force increased. To prevent sprung element 14 from being raised due to increased spring force, electronic valve 18 allows pressurized caliper control fluid to energize caliper 22 on downward rotating side of friction disk 17 creating a pulling force in its rod 21 between sprung and unsprung elements in magnitude designed to equal lifting force increase by springs 15.

Considering the great variety of vehicles into which the present invention could be installed, rather than using a mathematical approach, it is best to determine active control operation parameters in a test stand, on the principle that reciprocating impulses of rocking motion can be counteracted with identical opposing reciprocating impulses. The procedure would be to (1) record rocking motion of vehicle during normal operations, (2) install active controls in vehicle, (3) duplicate recorded rocking motion at a test site with reciprocating impulses generated with active controls and (4) use the obtained active control reciprocating impulse data in subsequent vehicle operations. The stationary test would be conducted with various simulated loads, speeds and wind conditions.

Control means for calipers 22 may be electrical instead of hydraulic as shown. Most physical components of the invention, including computer controlled braking devices, are presently in commercial use in other forms and applications. For example, electronic fuel injection technology for reciprocating engines could be adapted to deliver precisely timed and metered control fluid to the calipers. Energy use for active controls is estimated to amount to less than one percent of total vehicle operating energy. While the present invention is visualized primarily as an add-on installation for existing vehicles, new vehicles may have friction disks 17 installed directly on axles.

Tracks of high-speed trains receive intense maintenance and frequent realignments. Hence, when a section of track has been realigned, its previously recorded rocking motion must be updated, which would be an additional function of the sensing instruments at the front of the train. Also, further sensing instruments may be used, at least temporarily, to review and refine the performance of active controls.

What is claimed is:

1. A device for controlling the relative motion between two elements movably interconnected through a linkage which includes a spring assembly which tends to maintain the elements at an equilibrium position, at least the first element thereof being subjected to externally created motion inputs and tending to transmit a first force in response thereto to the second element thereof; said elements being provided with a means for applying a second, controlled, force therebetween; said device comprising:

(A) a connecting rod attached to one element and in sliding engagement with other element;

(B) means for producing pulling and pushing forces at sliding end of connecting rod;

(C) a controller adapted to send a control signal to said means for producing pulling and pushing forces wherein said control signal is determined by:

(a) analyzing prior motion history, and based thereon together with input from current sensors, predicting externally created motion inputs.

2. The device of claim 1 wherein the first element is the unsprung, and the second element the sprung component of a fixed guideway vehicle.

3. The device of claim 1 wherein means for producing pulling and pushing forces is a reversible solenoid.

4. The device of claim 1 wherein means for producing pulling and pushing forces is a friction disk having riding thereon two horizontally opposed rotationally guided calipers.

5. The device of claim 4 wherein calipers are energized independently, one to provide a pushing second, controlled, force and the other a pulling second, controlled, force between sprung and unsprung elements.

* * * * *